US009413403B2

(12) United States Patent
Wentzloff et al.

(10) Patent No.: US 9,413,403 B2
(45) Date of Patent: Aug. 9, 2016

(54) WAKE-UP RECEIVER WITH AUTOMATIC INTERFERENCE REJECTION

(71) Applicant: The Regents of The University of Michigan, Ann Arbor, MI (US)

(72) Inventors: David D. Wentzloff, Ann Arbor, MI (US); Seunghyun Oh, Ann Arbor, MI (US); Nathan E. Roberts, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 14 days.

(21) Appl. No.: 14/490,786

(22) Filed: Sep. 19, 2014

(65) Prior Publication Data
US 2015/0087255 A1 Mar. 26, 2015

Related U.S. Application Data

(60) Provisional application No. 61/880,206, filed on Sep. 20, 2013.

(51) Int. Cl.
*H04B 1/00* (2006.01)
*H04B 1/12* (2006.01)
*H04B 1/10* (2006.01)
*H04W 52/02* (2009.01)

(52) U.S. Cl.
CPC .............. *H04B 1/123* (2013.01); *H04B 1/1027* (2013.01); *H04W 52/0229* (2013.01); *H04W 52/0235* (2013.01); *H04B 2001/1072* (2013.01); *Y02B 60/50* (2013.01)

(58) Field of Classification Search
CPC .................................... H04B 1/16; H04B 3/04
See application file for complete search history.

(56) References Cited

U.S. PATENT DOCUMENTS

| | | | | |
|---|---|---|---|---|
| 5,533,058 A | * | 7/1996 | Kady ................. | G06K 19/0723 375/317 |
| 5,546,055 A | * | 8/1996 | Klughart ............. | H03K 3/3545 331/116 FE |
| 6,253,161 B1 | * | 6/2001 | Arias-Estrada ......... | G01S 11/12 348/E3.018 |
| 6,304,828 B1 | * | 10/2001 | Swanick ................ | G01S 7/021 342/162 |

(Continued)

FOREIGN PATENT DOCUMENTS

JP  05022172 B2  9/2012
KR  20100019129 A  2/2010

OTHER PUBLICATIONS

S. Miller, et al., "A Nanowatt Bandgap Voltage Reference for Ultra-Low Power Application", 0-7803-9390-2 IEEE (2006).

*Primary Examiner* — Jaison Joseph
(74) *Attorney, Agent, or Firm* — Harness, Dickey & Pierce, PLC

(57) ABSTRACT

A low power radio is provided with automatic interference rejection. The radio is comprised generally of: an antenna, a rectifier, a comparator, and a correlator. The comparator receives an input signal from the rectifier, compares the input signal to a reference signal and outputs a digital signal. The correlator in turn receives the digital signal from the comparator, correlates the digital signal to a wake-up code and outputs a wake-up signal having a high value when the digital signal is highly correlated with the wake-up code. The radio further includes an automatic threshold controller which adjusts sensitivity of the comparator. Of note, the rectifier, the comparator, the correlator and the automatic threshold controller are comprised in part by circuits having transistors operating only in subthreshold region.

21 Claims, 6 Drawing Sheets

(56) References Cited

U.S. PATENT DOCUMENTS

| | | |
|---|---|---|
| 6,466,634 B1 | 10/2002 | O'Toole et al. |
| 6,593,845 B1 | 7/2003 | Friedman et al. |
| 7,720,513 B2 | 5/2010 | Enenkl |
| 7,864,051 B2 * | 1/2011 | Paradiso ............... G06K 7/0008 340/10.33 |
| 2005/0237160 A1 * | 10/2005 | Nolan ................ G06K 19/0705 340/10.33 |
| 2006/0229053 A1 * | 10/2006 | Sivard ................ A61N 1/37223 455/343.2 |
| 2007/0103224 A1 * | 5/2007 | Namekawa ........... H02M 3/073 327/536 |
| 2009/0170461 A1 | 7/2009 | Kwon et al. |
| 2010/0112950 A1 | 5/2010 | Haartsen et al. |
| 2010/0207740 A1 | 8/2010 | Geiszler et al. |
| 2010/0216523 A1 * | 8/2010 | Sebastiano ........ H04W 52/0229 455/574 |
| 2010/0231293 A1 | 9/2010 | Cho et al. |
| 2010/0240319 A1 * | 9/2010 | Matsuo ............. H04W 52/0225 455/68 |
| 2010/0253442 A1 * | 10/2010 | Mu ......................... H03J 3/20 333/17.1 |
| 2010/0329387 A1 | 12/2010 | Watanabe |
| 2011/0140851 A1 | 6/2011 | Lee et al. |
| 2011/0202103 A1 | 8/2011 | Wikman et al. |
| 2012/0163422 A1 * | 6/2012 | Lee ................... H04W 52/0229 375/211 |
| 2014/0146729 A1 * | 5/2014 | Graf ................. H04W 52/0209 370/311 |

\* cited by examiner

WAKE-UP RECEIVER WITH AUTOMATIC INTERFERENCE REJECTION

CROSS-REFERENCE TO RELATED APPLICATIONS

This application claims the benefit of U.S. Provisional Application No. 61/880,206 filed on Sep. 20, 2013. The entire disclosure of the above application is incorporated herein by reference.

GOVERNMENT CLAUSE

This invention was made with government support under grant number CNS1035303 awarded by the National Science Foundation. The government has certain rights in this invention.

FIELD

The present disclosure relates to a low power radio and more particularly a wake-up receiver with automatic interference rejection.

BACKGROUND

Wireless sensors spend most of the time in an ultra-low-power sleep state with their radios off to conserve energy. This presents a problem for remotely waking up and synchronizing to these nodes. Wake-up radios (WRX) are a viable solution, but only if their active power is below the sleep power of the node, otherwise the WRX power dominates and dictates the lifetime of the node. With digital sleep power being reported in the nW range, this presents a significant challenge to WRX design. A simple method for reducing the power of a WRX is to reduce sensitivity, which is tolerable for short-range communication and when the primary goal is a lifetime of multiple years. For example, with a receiver sensitivity of −40 dBm, 6 m communication at 400 MHz is possible with only 0 dBm transmit power. This is suitable for a broad range of medical and internet of things applications.

Most published WRXs use energy detection architectures to keep power low; however, any signal at the proper frequency can trigger a false wake-up of these radios, and false wake-ups result in significant amounts of wasted energy on the node. In order to prevent this, a WRX must have enough local processing to differentiate a wake-up event from interference without use of the node's main processor. This disclosure presents a 116 nW wake-up receiver complete with crystal reference, interference compensation, and all the necessary baseband processing, such that a selectable 31-bit code is required to toggle a wake-up signal. The front-end operates over a broad frequency range, tuned by an off-chip band-select filter and matching network, and is demonstrated in the 403 MHz MICS band, and the 915 MHz and 2.4 GHz ISM bands. Additionally, the baseband processor implements automatic threshold feedback to detect the presence of interferers and dynamically change the receiver's sensitivity, mitigating the jamming problem inherent to previous energy-detection WRXs.

This section provides background information related to the present disclosure which is not necessarily prior art.

This section provides background information related to the present disclosure which is not necessarily prior art.

SUMMARY

This section provides a general summary of the disclosure, and is not a comprehensive disclosure of its full scope or all of its features.

A low power radio is disclosed. The radio is comprised generally of: an antenna, a rectifier, a comparator, and a correlator. The rectifier receives an RF signal via the antenna and generates a rectified input signal. The comparator in turn receives the input signal from the rectifier, compares the input signal to a reference signal and outputs a digital signal. The correlator receives the digital signal from the comparator, correlates the digital signal to a wake-up code and outputs a wake-up signal, where the wake-up signal has a high value when correlation between the digital signal and the wake-up code exceeds a correlation threshold and a low value when correlation between the and the wake-up code is less than a correlation threshold. Each of the rectifier, the comparator and the correlator are comprised in part by circuits having transistors operating only in subthreshold region.

In one embodiment, the rectifier is further defined as a Dickson Multiplier circuit.

In some embodiments, the correlator is further defined by a plurality of the correlators operating in parallel, such that each correlator receives different shifted samples from a bit slice of the input signal and compares the shifted samples to the wake-up code.

The low power radio may include an automatic threshold control circuit configured to receive the digital signal from the comparator and adjust the reference signal to change sensitivity of the receiver. More specifically, the automatic threshold control circuit decreases sensitivity of the comparator circuit when the number of consecutive samples from the digital signal having a high value exceeds a first threshold and increases sensitivity of the comparator circuit when the number of consecutive samples from the digital signal having a low value exceeds a second threshold. Likewise, the automatic threshold control circuit is preferably comprised in part by digital circuits having transistors operating only in subthreshold region.

The low power radio also includes an oscillator which generates a clock signal, where the comparator, the correlator and automatic threshold control are clocked by the oscillator.

In some embodiments, the oscillator includes a crystal and an oscillator circuit, where the oscillator circuit includes an amplifier coupled across the crystal and the amplifier is biased by a feedback circuit to sustain oscillation of the crystal with minimum power consumption.

The low power radio may further include a low-power amplifier electrically coupled between the antenna and the rectifier.

In some embodiments, the rectifier, the comparator circuit, the correlator circuit, the automatic threshold control circuit and the oscillator circuit are implemented as an integrated circuit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
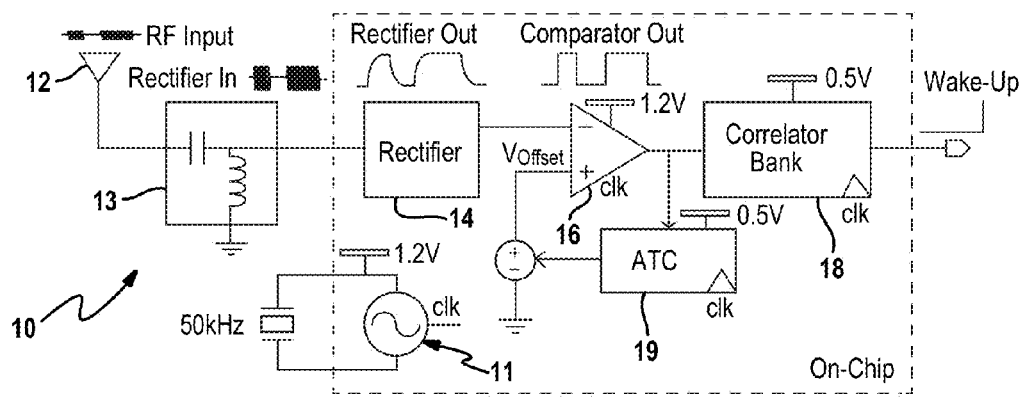
FIG. 1 is a block diagram depicting the architecture for an example wake-up radio.

FIG. 1 depicts the architecture for an example wake-up radio 10. The radio 10 is comprised generally of an antenna 12, a rectifier 14; a comparator 16 and a correlator 18. The radio 10 may further include a band-select filter 13, an oscillator 11 and an automatic threshold control circuit 19. In an example embodiment, the oscillator 11, the rectifier 14, the comparator 16, and the automatic threshold control circuit 19 are implemented as an integrated circuit; whereas, the antenna 12, the filter 13 and the crystal driving the oscillator 11 are located off chip. It is noted that these circuits use a thick-oxide PMOS header to improve sleep power. It is understood that only the relevant components of the radio are discussed in relation to FIG. 1, but that other components, such as a controller or an audio output, may be needed to construct an operational device. Other arrangements for the components are also contemplated by this disclosure.

During operation, the antenna 12 is configured to receive an RF signal. The RF signal first passes through an input matching network (i.e., filter 13) that filters and boosts the signal before going on-chip. In the example embodiment, a 2 element off-chip matching network was used and provided a passive 5 dB voltage boost. The input impedance of the chip was measured on a network analyzer to be 23-j35Ω, at 400 MHz so a 12 pF series capacitor and a 15.7 nH shunt inductor were used. The Q factor of the input impedance is low, due to a voltage limiter that prevents the rectified voltage from exceeding the breakdown voltage of the FETs, so a broadband matching network could be implemented. Devices like bulk acoustic resonators, film bulk acoustic resonators or surface acoustic wave filters can also be used to tune to the desired frequency of operation.

Because the sensitivity has been reduced, a low noise amplifier is not necessary to amplify the received signal. Instead a zero-power RF rectifier 14 replaces the amplifier as shown in FIG. 1, thereby saving significant power and allowing communication in the nanowatt range. In other embodiments, a low noise amplifier may be placed on chip in between the filter 13 and the rectifier 14.

Figure 2:
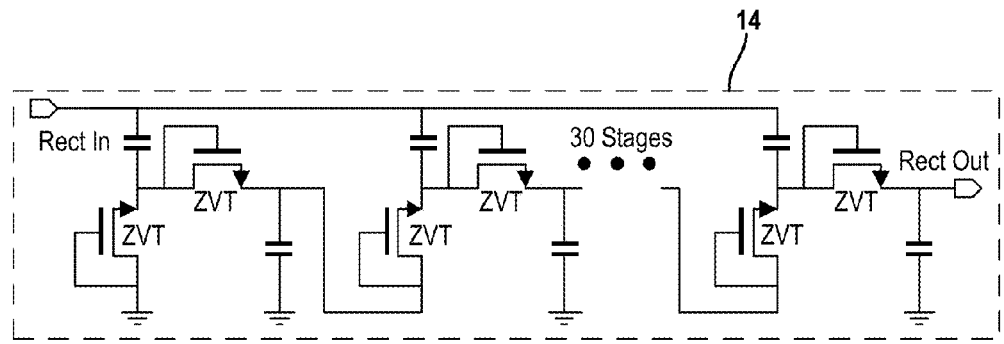
FIG. 2 is a schematic of an example rectifier circuit which may be used in the wake-up radio.

The rectifier 14 is configured to receive the RF signal from the antenna and generate a rectified input signal. FIG. 2 depicts an example embodiment for the rectifier 14. In the example embodiment, the incoming signal is in the form of on-off keying (OOK) and thus the rectifier 14 outputs a signal having a pulse shape. To do so, the structure of the rectifier 14 is similar to a Dickson Multiplier circuit except that all of the transistors comprising the rectifier operate in the subthreshold region. Thus, the output voltage calculation is different due to the small RF input. In the example embodiment, 30 stages are used to achieve sufficient RF gain with fast charging time although more or less stages are contemplated. The incoming signal may take other forms (e.g., FSK) and thus may not require any rectification or require a different type of rectification. Thus, other circuit arrangements for the rectifier 14 are also contemplated by this disclosure.

Figure 3A:
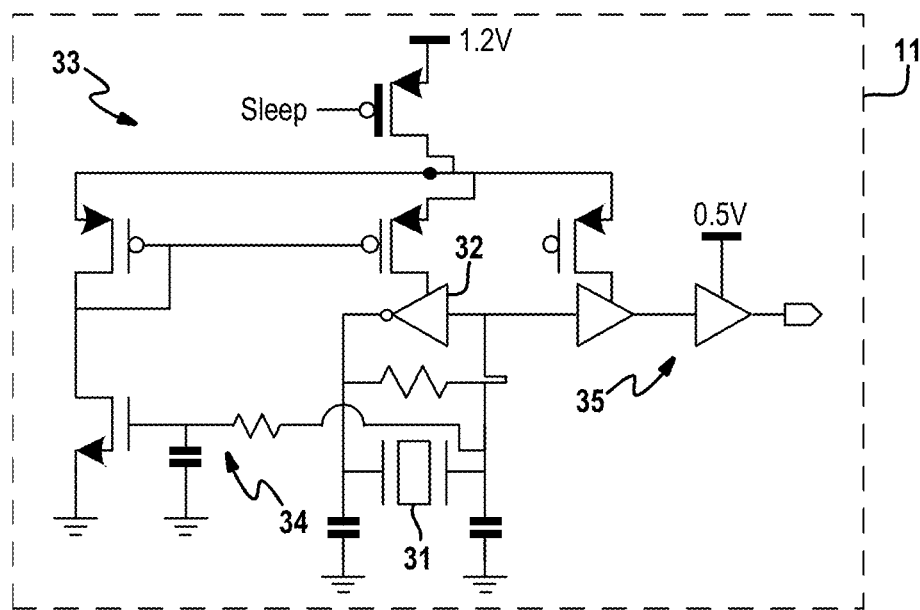
FIG. 3A is a schematic of an example oscillator circuit which may be used in the wake-up radio.
Figure 3B:
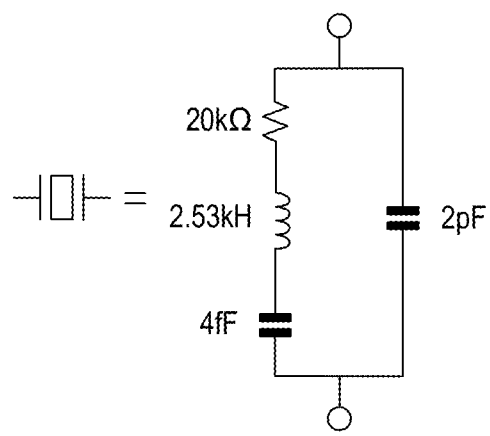
FIG. 3B is a schematic showing the intrinsic values for a 50 kHz crystal.

An oscillator 11 provides the reference clock for the wake-up radio 10. With reference to FIGS. 3A and 3B, the oscillator 11 is comprised of an off-chip crystal 31 (e.g., 50 kHz) and an on chip oscillator circuit operating in subthreshold region. In the example embodiment, the primary amplifier 32 for the oscillator is an inverter with resistive feedback. The feedback circuit for the crystal includes a current mirror 33 and an RC filter 34 that pulls out the DC level from the crystal output and tunes the current mirror 33. A pair of buffers 35 is used to shape the oscillator output.

FIG. 3B shows the intrinsic values of the 50 kHz crystal. For illustration purposes, the transconductance of the amplifier that must be produced to achieve sustained oscillations is calculated using these intrinsic values and equation 1 below.

$$\text{Critical } g_m = \Omega/QC^*(C_1C_2+C_2C_0+C_0C_1)^2/C_1C_2 \tag{1}$$

where C and $C_0$ represent the motional and shunt capacitance of the crystal, $\Omega$ is resonant frequency, Q factor of the crystal, and C1 and C2 are the load capacitance in the circuit. If the primary amplifier 32 is biased in the near threshold region where the $g_m/i_D$ ratio is around 10, then the current consumption to reach this critical $g_m$ value is around 20 nA. Initially, the transconductance of the primary amplifier 32 is much greater than the critical transconductance $g_m$ of the crystal, which is needed to quickly increase the oscillation amplitude. However, as the oscillation amplitude increases, the DC level of the oscillation also drops and this common-mode signal is used in feedback to starve the primary amplifier until it settles with sustained oscillations. Measured results show the total power consumption is 30 nW when sustaining oscillations using a 1.2V supply. The oscillation is then buffered to provide the reference clock for the radio. While particular reference has been made to an oscillator which achieves low power consumption, other types of oscillators, such as a ring oscillator, an LC oscillator, a resistive oscillator or a phase lock loop circuit, are contemplated within the scope of this disclosure.

Figure 4:
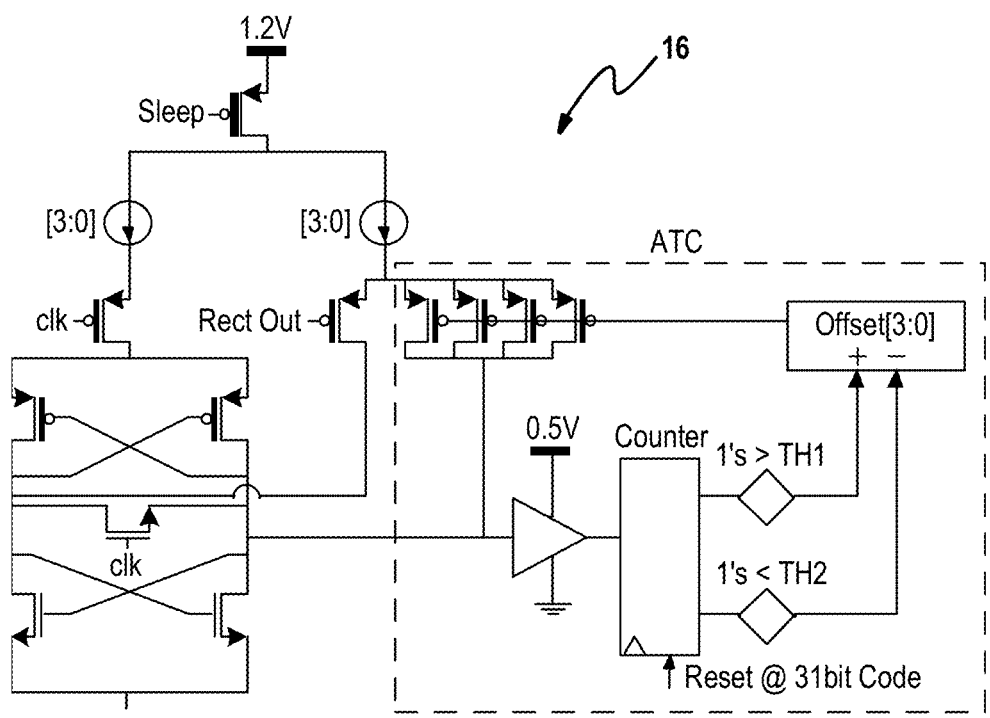
FIG. 4 is a schematic of an example comparator and automatic threshold control circuit which may be used in the wake-up radio.

FIG. 4 depicts an example embodiment of a comparator circuit 16 with automatic threshold control. The comparator circuit 16 receives an input signal from the rectifier 14 and compares the input signal to a reference signal (i.e., offset voltage). The comparator circuit 16 outputs a digital signal with a high value when the input signal exceeds the reference signal and output a signal with a low value when the input signal does not exceed the reference signal. Of note, the comparator 16 is comprised in part by digital circuits having transistors operating only in the subthreshold region. In the example embodiment, the comparator circuit 16 is commonly referred to as a regenerative gain dynamic comparator which applies regenerative feedback clocked by the oscillator 11. Two separate current biases are each controlled by 4-bit binary-weighted current digital-to-analog converters. The comparator threshold can be programmed to a 4-bit binary weighted value to tune the sensitivity of the radio. The comparator circuit may be viewed more generally as a demodulator and thus may be replaced with other types of demodulating circuit such as an analog-to-digital converter.

The offset voltage of the comparator is controlled by the automatic threshold controller 19 to overcome interference signals. The automatic threshold controller 19 monitors the samples coming from the output of the comparator 16 for a predefined period of time (e.g., one 31-bit code period). If the number of high values (i.e., 1's) is greater than a programmable value, then an interfering signal is presumed to be present and the automatic threshold controller 19 will increase the comparator's threshold to bring the sensitivity of the receiver above that of the interfering signal. When the number of low values (i.e., 0's) at the output of the comparator reaches a separate programmable value, then the interfering signal is presumed to be gone and the ATC reduces the threshold to increase the sensitivity of the receiver. Hysteresis is added between the values of the two programmable thresholds to eliminate limit-cycles. With this mechanism, the comparator can reject interference signals, and even if the interference signal is modulated by BPSK or OOK, the comparator threshold is set above the maximum level of interference so the comparator will produce the correct output.

Figure 5:
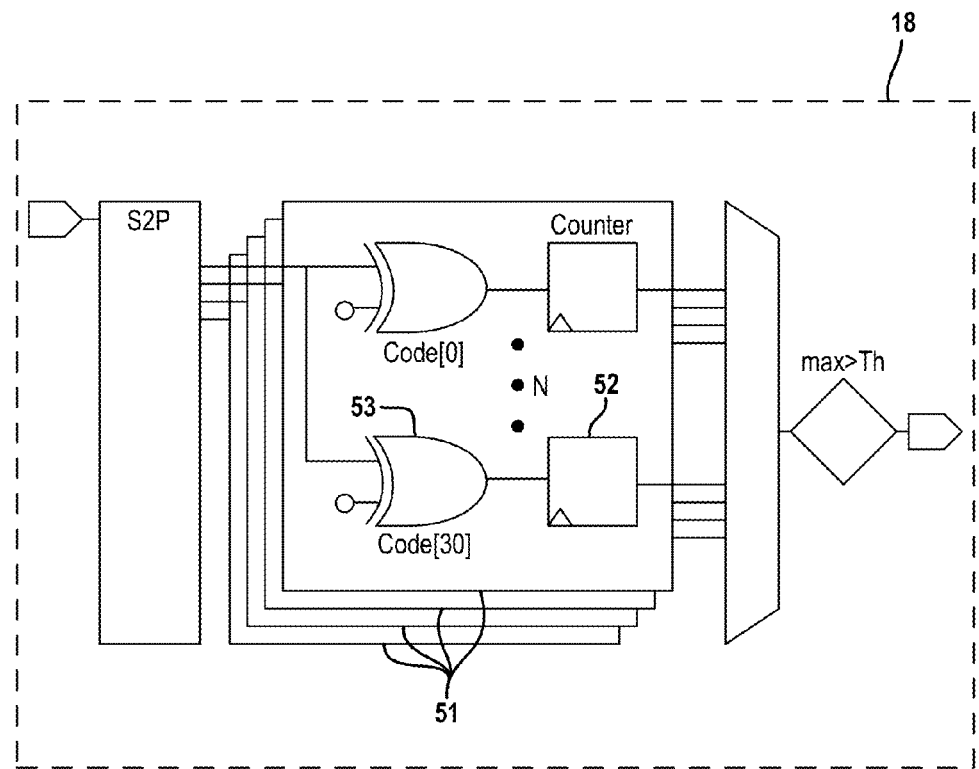
FIG. 5 is a schematic of a correlator circuit which may be used in the wake-up radio.

With reference to FIG. 5, the correlator 18 continuously compares the code embedded in the incoming RF signal with a wake-up code stored by the correlator. The correlator 18 in turn outputs a wake-up signal having a high value when the correlation result exceeds a correlation threshold and having a low value when the correlation result does not exceed the correlation threshold. The wake-up signal can be used as an activation signal for another radio component. For example, the wake-up signal can be used to activate or power-up a controller, another radio transceiver (e.g., Bluetooth transceiver) or another radio component operating a low power consumption mode (e.g., a sleep mode). It is envisioned that the wake-up signal may have applications outside of a radio such as a wireless sensor or the like.

In the example embodiment, a bank of four correlators 51 continuously correlates the oversampled comparator bit-stream with a programmable wake-up code (e.g., 31-bit Gold code). This synchronizes to the transmitted code and only issues a wake-up output when the desired code is received. Gold codes are a set of binary sequences whose cross-correlation among the set is bounded into three values. Gold codes are commonly used when implementing CDMA. In the example embodiment, the gold codes are implemented with two linear feedback shift registers 52 and an XOR gate 53. 31-bit Gold codes with three configuration bits are implemented. In an example embodiment, the last two bits of the oversampled comparator bit-stream are used in the correlation. That is, the correlator compares the last two samples in each bit slice with the code and thus each 31-bit code results in a total of 62 comparisons. A programmable correlator threshold allows the user to define a value between 1 and 61 that must be exceeded in order to declare a code received indicating a valid wake-up event. A lower correlator threshold means fewer bits have to match the code, improving sensitivity, but resulting in more false wake-ups. A higher correlator threshold prevents false wake-ups, but also reduces the sensitivity of the receiver. While reference is made to CDMA and Gold codes, it is understood that the wake-up radio may employ other types codes.

To synchronize the receiver to the transmitted code, the four correlators 51 operate at the same time and each correlator 51 receives shifted samples of each bit slice since the receiver is oversampled (e.g., four times). In each correlator, all possible shifts of the 31 bit Gold code are simultaneously correlated with the incoming bit stream, so that after a single 31 bit sequence, the receiver is guaranteed to synchronize to the wake-up signal. Each parallel correlator 51 will have a different number of correct comparisons based on the code shifts and phase difference between the receiver and the transmitter. If any of the four correlators results are greater than the correlator threshold, the wake-up signal will be asserted.

In another aspect of this disclosure, the correlator circuit, the automatic threshold control circuit and the oscillator circuit described above can be combined to form a low power baseband processor. Such a baseband processor can be interfaced with any type of receiver that has demodulated data which has been converted into the digital domain and serves as input to the correlator circuit.

Figure 6:
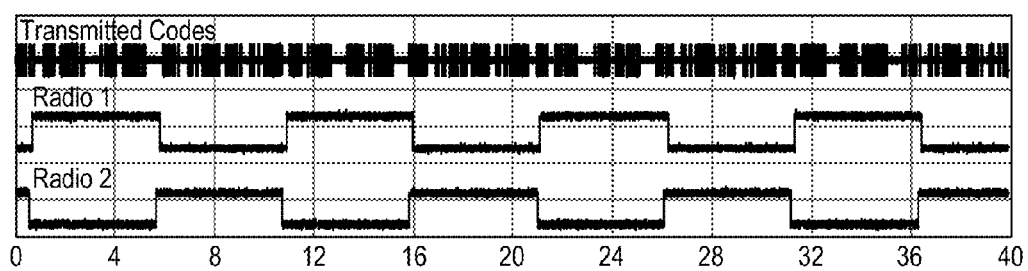
FIG. 6 is a graph illustrating the radio's ability to reject codes it is not programmed to detect.

FIG. 6 demonstrates the receiver's ability to reject codes it is not programmed to detect. In this setup, the arbitrary waveform generator (AWG) and vector signal generator (VSG) were transmitting two different codes back to back. The signal was then split and sent to two different WRXs that were each programmed to wake-up upon receiving the different codes. The top figure shows the transmitted OOK signal and that each WRX toggles its wake-up signal when receiving its own code, but not when receiving the other's code.

Figure 7A:
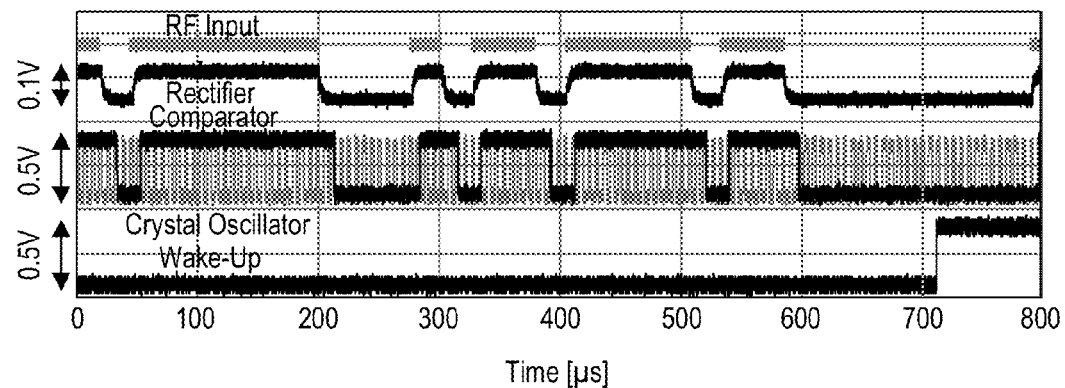
FIG. 7A is a graph illustrating the transient response of the wake-up radio during normal operation.

Detailed transient operation of the wake-up radio 10 receiving a 31-bit code is shown in FIG. 7A. The WRX automatically synchronizes to the incoming bit stream. The top two traces show the RF signal and the RF rectifier converting the signal to baseband. The third trace shows the output of the comparator being clocked at 4× the data-rate by the oscillator and the final trace is the wake-up signal being toggled by the correlator. The WRX is capable of CDMA by selecting different codes used by the correlator block.

Figure 7B:
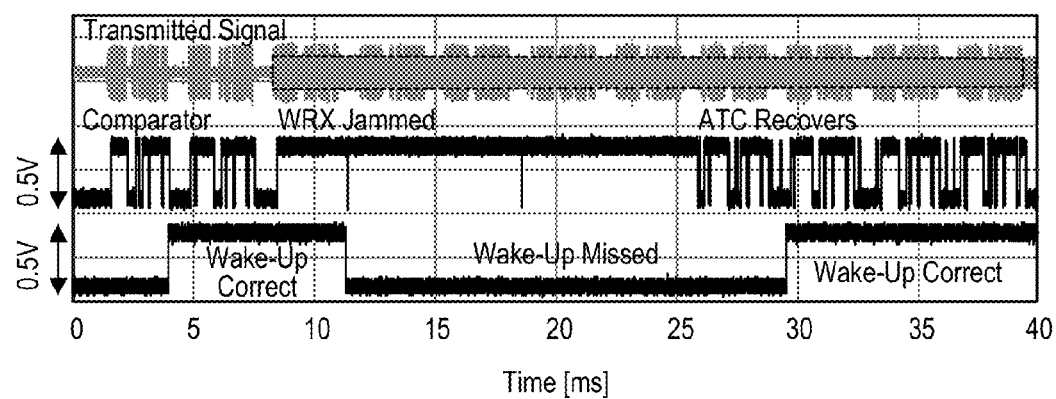
FIG. 7B is a graph illustrating the transient response of the wake-up radio during the presence of an interferer.

If an interfering signal is strong enough to exceed the comparator threshold (saturating the bit-slicer), then the ATC increases the comparator's threshold until it is above the interfering signal. A transient of this operation can be seen in FIG. 7B. The top signal is the received RF signal, which is jammed by a 2.4 GHz tone at 8 ms. With the interferer present, the comparator initially outputs 1's so that the receiver cannot receive the code. After 15 ms, the ATC has raised the threshold of the comparator above that of the interferer, and the WRX regains synchronization.

Figure 8A:
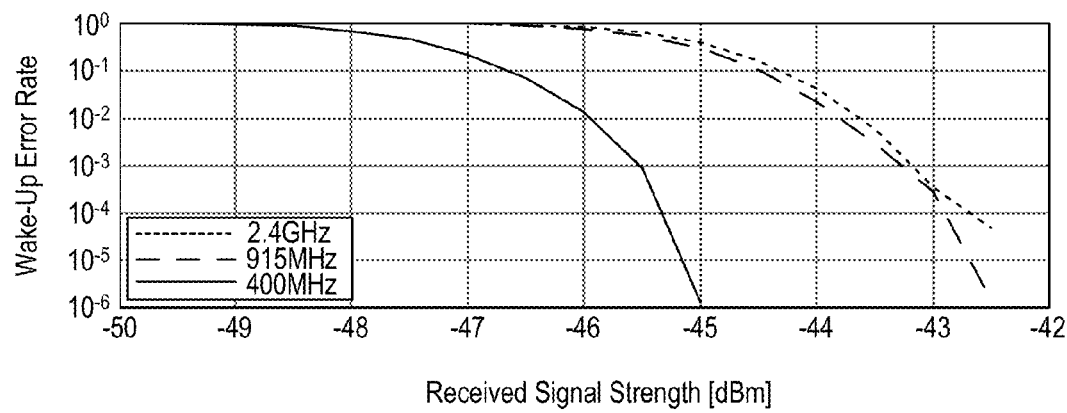
FIGS. 8A and 8B are graphs depicting the wake-up error rate in relation to signal strength and correlator threshold, respectively.

FIG. 8A shows the chip error rate (BER) curves for the 403 MHz, 915 MHz, and 2.4 GHz bands. Sensitivity is best in the 403 MHz range.

Figure 8B:
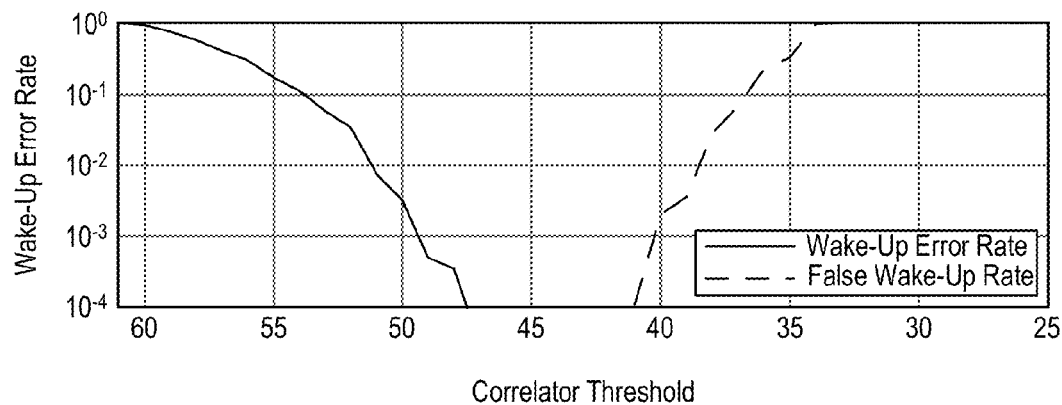

FIG. 8B shows BER as the correlator threshold is varied. The measurements were taken using a −40 dBm signal in the 2.4 GHz band. The figure also shows the impact this threshold has on false wake-ups. From these two datasets, the correlator threshold can be set to maximize sensitivity while minimizing the possibility of a false wake-up.

In the example embodiment, the wake-up radio 10 has an active power of 116 nW with a sleep power of 18 pW, afforded by thick-oxide headers. A full power breakdown can be found in Table I below. The digital baseband processing consumes the majority of the power in the WRX.

TABLE I

Power breakdown and receiver specs

| Power Breakdown [nW] | | Receiver Specs | |
|---|---|---|---|
| RF Rectifier | 0 | Energy/bit | 9.28 pJ |
| Comparator | 8.4 | Energy/wakeup | 287.7 pJ |
| Digital Logic | 69.5 | Max Signal level | −15 dBm |
| Crystal Oscillator | 38.4 | Max interferer level | −20 dBm |

TABLE I-continued

Power breakdown and receiver specs

| Power Breakdown [nW] | | Receiver Specs | |
|---|---|---|---|
| TOTAL | 116.3 | Code length | 31 |
| Sleep[pW] | 20 | # of pre-defined codes | 8 |

This disclosure introduced a low power wake-up radio that uses CDMA codes to provide interference rejection from both in-band and out-of-band interferers. With reduced sensitivity specifications, the use of a zero-power RF energy harvester was used as the RF front end of the receiver and sub-threshold design was implemented to keep entire radio in the nanowatt power region. With power that is less than a typical sensor node's sleep power, the WRX is not the energy dominant circuit when the node is asleep and can provide false wake up rejection, making it a very suitable synchronization technique for sensor nodes.

In the example set forth above, the wake-up receiver is programmed with a single wake-up code. In other embodiments, the wake-up receive may be programmed with more than one wake-up code (e.g., 4 codes). In this way, different codes may be used to wake-up the radio and each different code could be mapped to a different type of function. For example, one code may indicate to power-up a controller while another code may indicate to power-up another type of transceiver.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A low power radio, comprising:
an antenna configured to receive an RF signal;
a rectifier configured to receive the RF signal from the antenna and generate a rectified input signal;
a comparator configured to receive the input signal from the rectifier, the comparator compares the input signal to a reference signal and outputs a digital signal;
an automatic threshold control circuit configured to receive the digital signal from the comparator and adjust the reference signal to change sensitivity of the receiver, wherein the automatic threshold control circuit is comprised in part by digital circuits having transistors operating only in subthreshold region; and
a correlator comprised in part by digital circuits having transistors operating in subthreshold region, the correlator configured to receive the digital signal from the comparator, correlate the digital signal to a wake-up code and output a wake-up signal, the wake-up signal having a high value when correlation between the digital signal and the wake-up code exceeds a correlation threshold and a low value when correlation between the digital signal and the wake-up code is less than a correlation threshold.

2. The low power radio of claim 1 wherein the rectifier is comprised in part by circuits having transistors operating only in subthreshold region.

3. The low power radio of claim 1 wherein the rectifier is further defined as a Dickson Multiplier circuit.

4. The low power radio of claim 1 wherein comparator is comprised in part by circuits having transistors operating only in subthreshold region.

5. The low power radio of claim 1 wherein the correlator is further defined as a plurality of the correlators operating in parallel, such that each correlator receives different shifted samples from a bit slice and compares the shifted samples to the wake-up code.

6. The low power radio of claim 1 further comprises an oscillator that generates a reference clock signal, where the comparator and the correlator use the reference clock signal from the oscillator.

7. The low power radio of claim 6 wherein the oscillator includes a crystal and an oscillator circuit, where the oscillator circuit includes an amplifier coupled across the crystal and the amplifier is biased by a feedback circuit to sustain oscillation of the crystal with minimum power consumption.

8. The low power radio of claim 7 wherein the rectifier, the comparator, the correlator and the oscillator circuit are implemented as an integrated circuit.

9. The low power radio of claim 1 further comprises a low-power amplifier electrically coupled between the antenna and the rectifier.

10. The low power radio of claim 1 further comprises a radio component configured to receive the wake-up signal from the correlator while operating in a low power consumption mode, the radio component transitions from a low power consumption mode to a high power consumption mode in response to receiving the wake-up signal with a high value.

11. A low power radio, comprising:
a rectifier configured to receive an RF signal and generate a rectified input signal;
a comparator circuit having transistors operating only in subthreshold region, the comparator configured to receive the input signal from the rectifier, compares the input signal to a reference signal and outputs a digital signal;

a correlator circuit having transistors operating only in subthreshold region, the correlator configured to receive the digital signal from the comparator circuit, correlate the digital signal to a wake-up code and output a wake-up signal, the wake-up signal having a high value when correlation between the digital signal and the wake-up code exceeds a correlation threshold and a low value when correlation between the digital signal and the wake-up code is less than a correlation threshold; and automatic threshold control circuit having transistors operating only in subthreshold region, the automatic threshold control circuit configured to receive the digital signal from the comparator circuit and adjust the reference signal in accordance with values of the digital signal.

12. The low power radio of claim 11 wherein the rectifier is further defined as a Dickson Multiplier circuit.

13. The low power radio of claim 11 wherein the correlator circuit is further defined as a plurality of the correlators operating in parallel, such that each correlator receives different shifted samples from a bit slice and compares the shifted samples to the wake-up code.

14. The low power radio of claim 11 wherein the rectifier, the comparator circuit, the correlator circuit and the automatic threshold control circuit are implemented as an integrated circuit.

15. The low power radio of claim 11 further comprises an oscillator that generates a reference clock signal, where the comparator circuit and the correlator circuit use the reference clock signal from the oscillator.

16. The low power radio of claim 15 wherein the oscillator includes a crystal and an oscillator circuit, where the oscillator circuit includes an amplifier coupled across the crystal and the amplifier is biased by a feedback circuit to sustain oscillation of the crystal with minimum power consumption.

17. A low power baseband processor, comprising:

a correlator circuit configured to receive a digital signal from a demodulator, correlate the digital signal to a wake-up code and output a wake-up signal, the wake-up signal having a high value when correlation between the digital signal and the wake-up code exceeds a correlation threshold and a low value when correlation between the digital signal and the wake-up code is less than a correlation threshold;

an automatic threshold control circuit configured to receive the digital signal from the demodulator and adjust sensitivity of the demodulator in accordance with values of the digital signal; and an oscillator circuit that generates a clock signal, where the correlator circuit and the automatic threshold control circuit are clocked by the clock signal from the oscillator circuit and the correlator circuit, the automatic threshold control circuit and the oscillator circuit include transistors operating only in subthreshold region.

18. The low power baseband processor of claim 17 wherein the correlator circuit is further defined as a plurality of the correlators operating in parallel, such that each correlator receives different shifted samples from a bit slice of the digital signal and compares the shifted samples to the wake-up code.

19. The low power baseband processor of claim 17 wherein the automatic threshold control circuit decreases sensitivity of the demodulator when the number of consecutive samples from the digital signal having a high value exceeds a first threshold and increases sensitivity of the demodulator when the number of consecutive samples from the digital signal having a low value exceeds a second threshold.

20. The low power baseband processor of claim 17 wherein the demodulator, the correlator circuit and the automatic threshold control circuit are implemented as an integrated circuit.

21. The low power baseband processor of claim 17 further comprises a crystal that drives the oscillator circuit, where the oscillator circuit includes an amplifier coupled across the crystal and the amplifier is biased by a feedback circuit to sustain oscillation of the crystal with minimum power consumption.

* * * * *